Sheet 1, 2 Sheets.
4771X
M. Pennock.
Thrashing Mach.
Patented May 26, 1827.
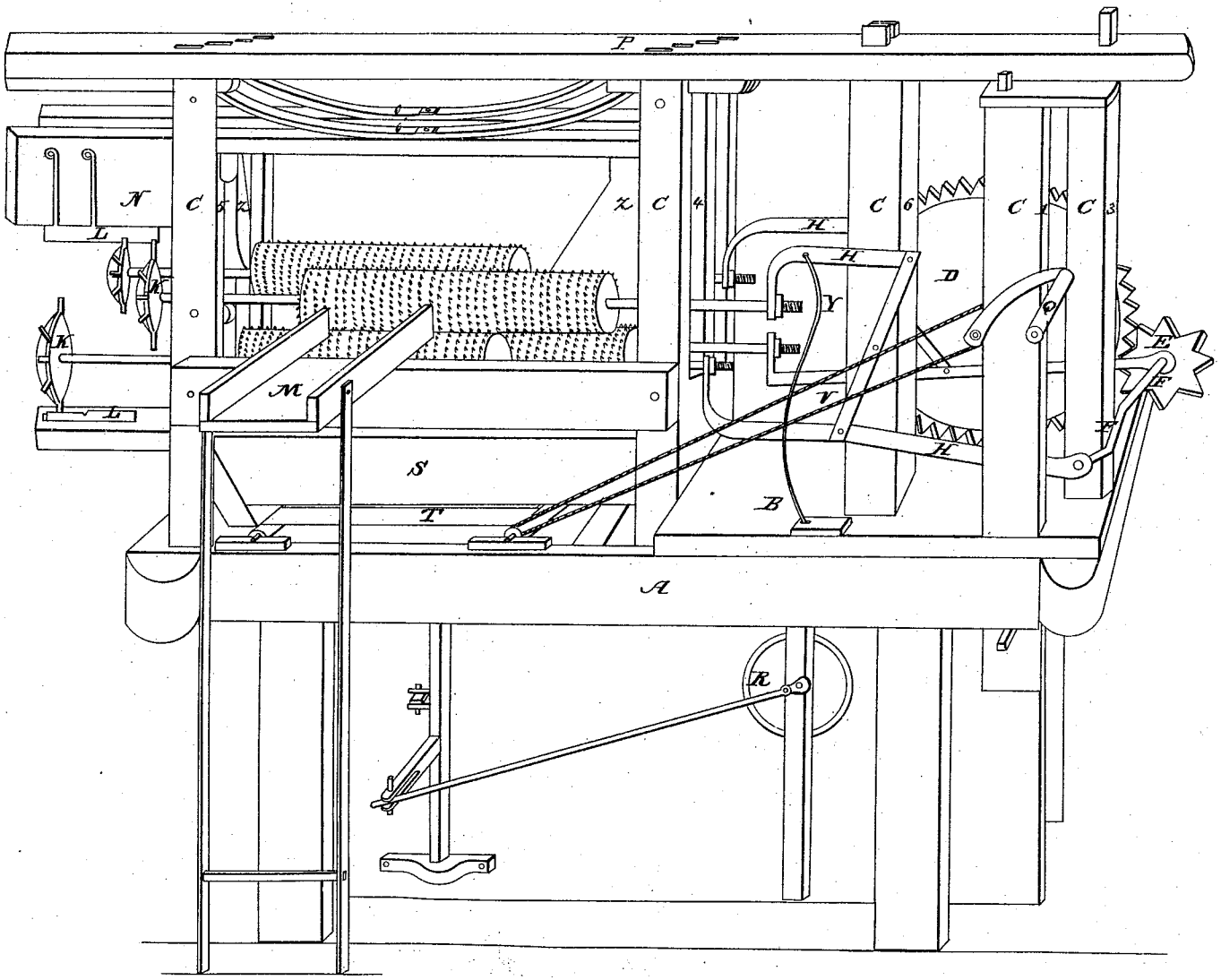
N. PETERS, PHOTO-LITHOGRAPHER, WASHINGTON, D. C.

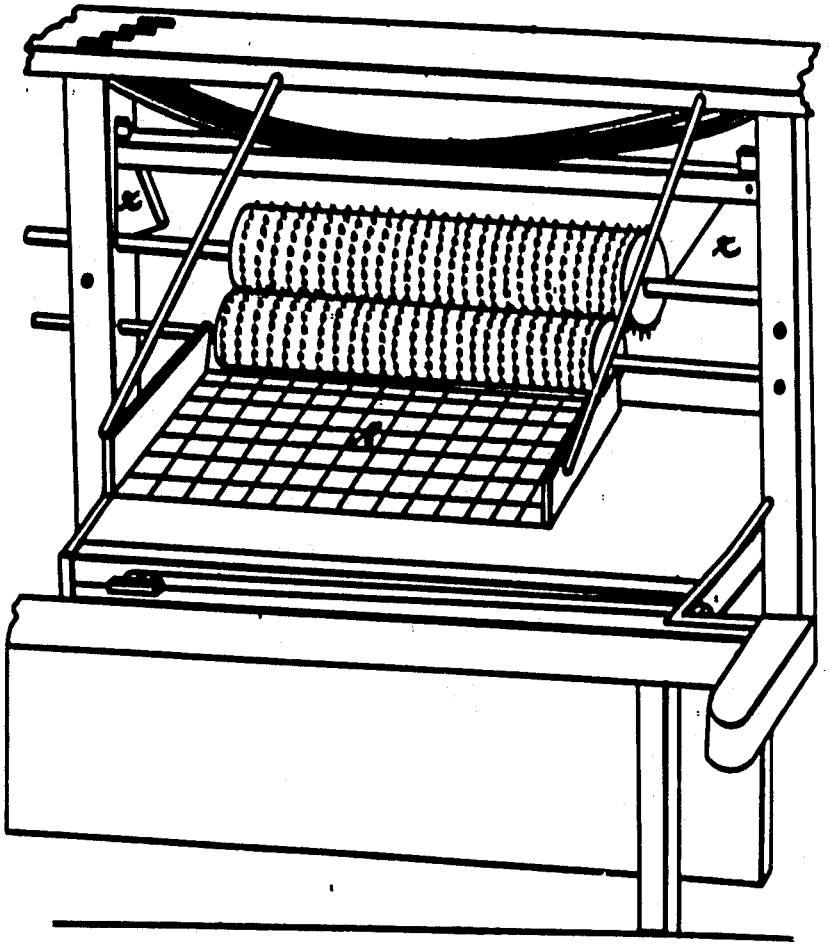

Sheet 2, 2 Sheets.
4771X
M. Pennock.
Thrashing Mach.
Patented May 20, 1827.